United States Patent [19]

Wong

[11] Patent Number: 4,667,004
[45] Date of Patent: May 19, 1987

[54] OLEFINIC BENZOCYCLOBUTENE POLYMERS

[75] Inventor: Pui K. Wong, Katy, Tex.

[73] Assignee: Shell Oil Company, Houston, Tex.

[21] Appl. No.: 812,207

[22] Filed: Dec. 23, 1985

[51] Int. Cl.$^4$ .............................................. C08F 12/32
[52] U.S. Cl. .................................... 526/284; 526/159
[58] Field of Search ................................. 526/284, 308

[56] References Cited

U.S. PATENT DOCUMENTS

| | | | |
|---|---|---|---|
| 3,497,483 | 2/1970 | Ketley | 260/79.5 |
| 4,414,132 | 11/1983 | Goodall et al. | 502/169 |
| 4,540,763 | 9/1985 | Kirchhoff | 526/281 |

OTHER PUBLICATIONS

Lloyd et al., Tetrahedron 1964, 20, 2185–94.
Lloyd et al., Tetrahedron 1965, 21, 2281–88.
Lloyd et al., Tetrahedron 1965, 21, 245–54.
Hubert et al., J. Chem. Soc., 1965, 3160–9.
Schiess, Tetrahedron Lett. 1978, 46, 4569–72.
Klundt, Chem. Rev. 1970, 70(4), 471–87.
Ewing et al., J. Chem. Soc., Chem. Commun., 1979, 207–8.
Gray et al., J. Am. Chem. Soc. 1978, 100, 2892–3.
Harruff et al., J. Am. Chem. Soc., 1978, 100, 2893–4.
Aalbersberg, Tetrahedron Lett. 1979, 22, 1939–42.
Boekelheide et al., Tetrahedron Lett. 1978, 4245–8.
Boekelheide, Topics in Current Chem. 1983, 113, 100–4.
Perkins et al., Angew. Chem. Int. Ed. Engl. 1978, 17(8), 615–6.

Primary Examiner—Paul R. Michl

[57] ABSTRACT

Solid homopolymers of an olefinic benzocyclobutene monomer of the formula

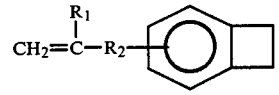

where $R_1$ is hydrogen or $CH_3$ and $R_2$ is $-(CH_2)_n-$ where n is 0 to 6 are claimed. Such polymers can be easily crosslinked at temperatures above about 200° C.

30 Claims, No Drawings

OLEFINIC BENZOCYCLOBUTENE POLYMERS

FIELD OF THE INVENTION

The present invention relates broadly to alphamonoolefin polymers and processes for preparing the same. More particularly, this invention relates to novel polymers of certain olefinic benzocyclobutene monomers.

BACKGROUND OF THE INVENTION

The polymerization of α-monoolefins to useful thermoplastic polymers by catalysis employing coordination catalysts is well known. Generally, the coordination catalysts comprise at least two compounds, one being a compound of a transition metal of groups IV-VIII of the Periodic Table, referred to herein as "procatalyst" and the other being an organometallic compound of a metal of groups I-III of the Periodic Table, referred to herein as "cocatalyst". Such coordination catalyst systems are often referred to as Ziegler catalysts. A group of these catalysts which is stereoregulating in the production of polymers of propylene and higher α-monoolefins is often referred to as Ziegler-Natta catalysts. In commercial Ziegler-Natta catalysts, the procatalyst is generally an active form of titanium chloride and the cocatalyst an alkyl- or alkyl halide compound of aluminum. These catalysts may be further modified by addition of compounds which increase the stereoregulating effect of the catalysts, referred to herein as selectivity control agents.

Polymers of ethylene, propylene, 1-butene and 4-methyl-1-pentene produced by means of such coordination catalysts are materials of commerce, both as homopolymers and copolymers.

A new alphamonoolefin polymer has now been found.

SUMMARY OF THE INVENTION

The present invention deals broadly with novel and non-obvious poly alpha monoolefin polymers and processes for preparing the same. In particular, the present invention relates to a solid homopolymer of an olefinic benzocyclobutene monomer of the formula:

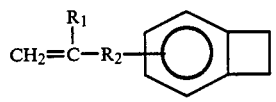

where $R_1$ is hydrogen or $CH_3$ and $R_2$ is $+CH_2+_n$ where n is 0 to 6. Further, the present invention also relates to a process for preparing a solid polymer, said process comprising homopolymerizing an olefinic benzocyclobutene monomer of the formula:

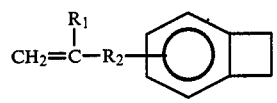

where $R_1$ is hydrogen or $CH_3$ and $R_2$ is $+CH_2+_n$ where n is 0 to 6, in the presence of a polyolefin coordination catalyst.

DETAILED DESCRIPTION OF THE INVENTION

Advantages of the Invention

The polyolefin of the present invention is a very reactive polymer at elevated temperature above about 200° C. Such a polymer may be crosslinked and employed as a plastic in typical plastics operations such as in making extruded or molded products. Alternatively, such a polymer may be functionalized, e.g. with maleic anhydride, and employed as a polymer blend component, e.g. with nylons. Further, such polymer can be an important intermediate that may be used as a matrix with other polymerizable monomers.

Olefinic Benzocyclobutene Monomer

The key aspect of the present invention involves the homopolymerization of a particular benzocyclobutene monomer and the resulting product. The olefinic benzocyclobutene monomers employed herein have the general formula:

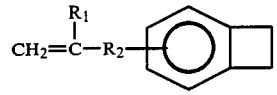

where $R_1$ is hydrogen or a $CH_3$ radical and $R_2$ is $+CH_2+_n$ where n is 0 to 6. Preferably, $R_1$ is H and n is 0 to 2. A preferred group of olefinic benzocyclobutene monomers includes:

| Monomer | Abbreviation |
|---|---|
| 4-(3-butenyl)benzocyclobutene | 4BBC |
| 3-(3-butenyl)benzocyclobutene | 3BBC |
| 4-allylbenzocyclobutene | 4ABC |
| 3-allylbenzocyclobutene | 3ABC |
| 4-vinylbenzocyclobutene | 4VBC |
| 3-vinylbenzocyclobutene | 3VBC |
| 4-isopropenylbenzocyclobutene | 4IBC |
| 3-isopropenylbenzocyclobutene | 3IBC |

As shown in Illustrative Embodiment I, the thermal electrocyclic ring-opening of such benzocyclobutene monomers is the key to their particular usefulness in the present invention. Such monomers should have very good stability up to at least 100° C. ($t_{\frac{1}{2}}=12$ years at 100° C. for benzocyclobutene) and high reactivity at elevated temperture ($t_{\frac{1}{2}}=1.5$ minutes at 250° C. for benzocyclobutene).

Catalysts

A number of different coordination catalysts of the Ziegler-Natta type are useful in the process of the invention. Broadly, such catalysts comprise a pro-catalyst which is a solid compound of a transition metal of group IV to VIII of the Periodic Table and a cocatalyst which is an alkyl compound, including alkyl halides and hydrides, of a metal of groups I to III. It is now well known that only a limited number of these compounds are practical for effectively converting a given monomer into a desired polymer. In general, the same catalysts which are effective for the polymerization of a particular monomer feed in a conventional polymerization process are also effective for the same conversion in the process of this invention.

Zielger-Natta coordination catalysts are discussed in detail in the book "Ziegler-Natta Catalysts and Polymerizations" by John Boor, Jr., Academic Press, 1979 and in numerous patents and review articles, including those cited by Boor.

More recently, catalysts having much higher activity have been developed both for polymerization of ethylene to linear high density polyethylene and for the stereoregular polymerization of higher a-monoolefins. The most active of these catalysts comprise procatalysts composites of magnesium or manganese halide, titanium halide and, in the case of stereoregulating catalysts, an electron donor. The cocatalysts generally are aluminum trialkyls and, in the case of stereoregulating catalyst, a selectivity control agent. Such catalysts are described, for example, in U.S. Pat. Nos. 4,113,654 and 4,265,785 and many other patents for ethylene polymerization and in U.S. Pat. No. 4,107,413 and 4,329,253 and European Pat. Nos. 19,330 and 29,623 and many others for stereospecific polymerization of α-monoolefins.

Suitable procatalysts for conversion of propylene and other α-monoolefins to isotatic polymers (which catalysts are useful herein) are violet $TiCl_3$ and composites of titanium chloride, magnesium chloride and an electron donor. Procatalysts of the type of violet $TiCl_3$ are preferably employed with alkyl aluminum halides, typically diethyl aluminum chloride, as cocatalyst. Procatalysts of the type of composites of titanium halide, magnesium halide and electron donor are preferably employed with trialkyl aluminum, typically triethyl aluminum as cocatalyst, and with an aromatic ester electron donor, such as ethyl p-methoxybenzoate (p-ethyl anisate) or p-methyl toluate as selectivity control agent.

Other catalysts may also be employed including halides or alkoxyhalides of a transition metal such as zirconium, vanadium, chromium and molybdenum. In the active catalyst the transition metal is at a valance below its maximum. Among the halogens the order of preference runs from chlorides to bromides to iodides to fluorides.

The olefinic benzocyclobutene monomer is homopolymerized in a manner similar or identical to that used in the polymerization and copolymerization of alpha monoolefin monomers. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the catalyst to the polymerization reactor(s).

Polymerization, as well as catalyst preparation, is carried out in the absence of air and water or in the presence of only very limited amounts of these, since otherwise the catalyst would be deactivated. Desired polymerization temperatures are between 20° C. and 100° C., preferably between 40° C. and 80° C.

The catalysts employed in the production of the subject polymers may be of sufficiently high activity that no product deashing step is required. If catalyst residues are to be deactivated and removed, this may be accomplished by conventional means employed in cleanup of olefin polymers produced over such catalysts, e.g., by contact with an alcohol, followed by extraction with water.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

Illustrative Embodiment I

A key aspect of the present invention deals with the ring-opening of the benzocyclobutene monomers to o-quinodimethanes. In this embodiment, half-life values for the parent benzocyclobutene are calculated and summarized in the following Table 1, based on activation parameters reported in W. R. Roth et al, Chem. Ber. 111, 3892–3903 (1978). The results suggest that reactive oligomers and polymers containing benzocyclobutenes which are not substituted at the cyclobutene ring would have long shelf-life and good reactivity at 200°–250° C.

TABLE 1

Benzocyclobutene $\xrightarrow{k}$ o-quinodimethane

| T (°C.) | k (sec$^{-1}$) | t$_{\frac{1}{2}}$ (hr) |
|---|---|---|
| 25 | $2.5 \times 10^{15}$ | $7.6 \times 10^{10}$ |
| 100 | $1.7 \times 10^{-9}$ | $1.1 \times 10^{5}$ |
| 150 | $9.6 \times 10^{-7}$ | $2 \times 10^{2}$ |
| 200 | $1.4 \times 10^{-4}$ | 1.4 |
| 250 | $7.8 \times 10^{-3}$ | $2.5 \times 10^{-2}$ |

Illustrative Embodiment II

This embodiment describes the preparation of reactive polyolefins via Ziegler-Natta polymerization using 4-(3-butenyl)benzocyclobutene (4BBC) as a model compound.

4BBC was prepared from 4-chloromethylbenzocyclobutene in a two-step process with an overall yield of 60% as follows.

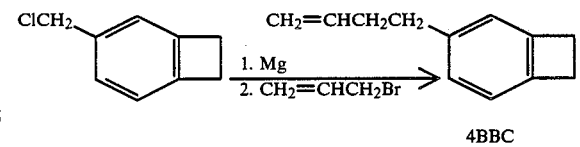

The structure of 4BBC was confirmed by $^1$H and $^{13}$C NMR. GC analysis showed it too be >99% pure.

The homo- and copolymerization of 4MP1 (4-methylpentene-1) and 4BBC were carried out in isooctane at 50° C. for 24 h using Stauffer TiCl$_3$.AA catalyst. The results summarized in Table 2 showed that the presence of benzocyclobutene had no deleterious effects on either polymer yields or molecular weights. The high yields of polymers regardless of monomer compositions suggest that 4BBC is not a polymerization inhibitor and should be readily copolymerizable with a wide variety of olefins. The molecular weights as measured by GPC and intrinsic viscosities were high. The GPC weight-average molecular weight of a copolymer containing 6% 4BBC was estimated to be about 1.33 million using polypropylene calibration. This value is higher than those of commercial polyolefins since no MW control agents was used in the polymerization.

$^{13}$C analysis of 4BBC homopolymer shows twelve carbon resonances whose chemical shifts are consistent with the 4BBC repeating unit. This confirms that benzocyclobutene is stable under ordinary Ziegler-Natta polymerization conditions. The chemical shifts of the backbone carbons of 4BBC homopolymer are δ31.9 and 39.4 ppm, whereas the values of corresponding carbons in the products from copolymerization are δ32.6 and 41.6 ppm. The difference suggests that copolymerization produced random copolymers rather than block polymers or mixtures of two homopolymers. The nearly identical monomer and copolymer compositions shown in Table 2 are also consistent with a random copolymerization process. The formation of copolymer was also supported by the formation of crosslinked copolymers containing as low as 0.5% m of 4BBC upon compression molding. Homopolymer of 4MP1 molded under identical conditions remained soluble in decalin.

TABLE 2

Polymerization of 4MP1 and 4BBC[a]

| Polymer No. | Monomer Composition 4MP1 (%) | 4BBC (%) | Co-catalyst | Polymer Yield (%) | % 4BBC[b] in Copolymer |
|---|---|---|---|---|---|
| 1 | 0 | 100 | TEA | 86 | 100 |
| 2 | 100 | 0 | DEAC | 94 | 0 |
| 3 | 94.4 | 5.6 | DEAC | 93 | 6 |
| 4 | 98.7 | 1.3 | DEAC | 96 | 1.5 |
| 5 | 99.5 | 0.5 | DEAC | 93 | <1 |

[a]TiCl$_3$/aluminum alkyl = 3; monomer/Ti = 200 in all cases except in the case of 100% 4BBC where monomer/Ti = 50.
[b]Determined by $^{13}$C NMR.

What is claimed is:

1. A solid crosslinkable homopolymer of an olefinic benzocyclobutene monomer of the formula

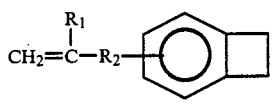

wherein R$_1$ is hydrogen or CH$_3$, R$_2$ is $-(CH_2)_n-$, and n is 0 to 6.

2. The polymer of claim 1 wherein said olefinic benzocylobutene monomer is selected from the group consisting of:
4-(3-butenyl)benzocyclobutene
3-(3-butenyl)benzocyclobutene
4-allylbenzocyclobutene
3-allylbenzycyclobutene
4-vinylbenzocyclobutene, and
3-vinylbenzocyclobutene.

3. The polymer of claim 1 wherein R$_1$ is hydrogen and n is 0 to 2.

4. The polymer of claim 1 wherein said olefinic benzocyclobutene monomer is 4-(3-butenyl)benzocyclobutene.

5. A process for preparing a solid reactive polymer comprises homopolymerizing an olefinic benzocyclobutene monomer of the formula:

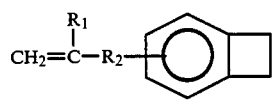

where R$_1$ is hydrogen or CH$_3$ and R$_2$ is (CH$_2$)$_n$ where n is 0 to 6, in the presence of a polyolefin coordination catalyst.

6. The process of claim 5 wherein said olefinic benzocyclobutene monomer is selected from the group consisting of:
4-(3-butenyl)benzocyclobutene
3-(3-butenyl)benzocyclobutene
4-allylbenzocylobutene
3-allylbenzycyclobutene
4-vinylbenzocyclobutene, and
3-vinylbenzocyclobutene.

7. The process of claim 5 wherein said olefinic benzocyclobutene monomer is 4-(3-butenyl)benzocyclobutene.

8. The process of claim 5 wherein said coordination catalyst is a titanium trichloride/trialkyl aluminum coordination catalyst.

9. The process of claim 8 wherein said coordination catalyst is a titanium trichloride/triethyl aluminum coordination catalyst.

10. The homopolymer of claim 1 having unreacted benzocyclobutene groups of the formula

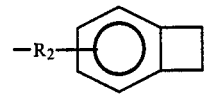

wherein R$_2$ is $-(CH_2)_n$, and n is 0 to 6.

11. A crosslinked polymer prepared by subjecting the homopolymer of claim 10 to a temperature effective for crosslinking the homopolymer through the unreacted benzocyclobutene groups.

12. The polymer of claim 11 wherein the temperature is from about 200° C. to about 250° C.

13. A homopolymer as prepared in the process of claim 5.

14. A crosslinked polymer prepared subjecting the homopolymer of claim 3 to a temperature effective for crosslinking the homopolymer through the unreacted benzocyclobutene groups.

15. The polymer of claim 14 wherein the temperature is from about 200° C. to about 250° C.

16. A process for preparing a solid crosslinkable homopolymer which process comprises contacting an olefinic benzocyclobutene monomer of the formula

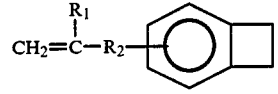

wherein R$_1$ is hydrogen or CH$_3$, R$_2$ is $-(-CH_2-)_n-$, and n is 0 to 6, in the presence of a polyolefin coordination catalyst under conditions suitable to prepare a polyolefin having an unreacted benzocyclobutene group.

17. The process of claim 16 wherein R$_1$ is hydrogen and n is 0 to 2.

18. The process of claim 16 wherein the olefinic benzocyclobutene monomer is selected from the group consisting of 4-(3-butenyl)benzocyclo butene, 3-(3-butenyl)benzocyclobutene, 4-vinylbenzocyclobutene, 3-vinyl benzocyclobutene, 4-allylbenzocyclobutene and 3-allylbenzocyclobutene.

19. The process of claim 18 wherein the olefinic benzocyclobutene monomer is 4-(3-butenyl)benzocyclobutene.

20. The process of claim 16 wherein the polyolefin coordination catalyst is a titanium trichloride/trialkyl aluminum coordination catalyst.

21. The process of claim 20 wherein the polyolefin coordination catalyst is a titanium trichloride/triethyl aluminum coordination catalyst.

22. The process of claim 16 wherein the reaction is carried out at a temperature between about about 20° C. and about 100° C.

23. The process of claim 16 wherein the reaction is carried out at a temperature between about about 40° C. and about 80° C.

24. The process of claim 16 wherein the reaction is carried out in the presence of air.

25. The process of claim 5 wherein the reaction is carried out at a temperature between about about 20° C. and about 100° C.

26. The process of claim 5 wherein the reaction is carried out at a temperature between about about 40° C. and about 80° C.

27. The process of claim 5 wherein the reaction is carried out in the absence of air.

28. A copolymer as prepared in the process of claim 16.

29. A crosslinked polymer prepared subjecting the homopolymer of claim 27 to a temperature effective for crosslinking the homopolymer through the unreacted benzocyclobutene groups.

30. The polymer of claim 28 wherein the temperature is from about 200° C. to about 250° C.

* * * * *